United States Patent [19]
Wang et al.

[11] Patent Number: 4,862,276
[45] Date of Patent: Aug. 29, 1989

[54] PUSH-PULL READOUT OF DUAL GATE CID ARRAYS

[76] Inventors: Samuel C. Wang, 4798 Hyde Rd., Manlius, N.Y. 13104; John M. Swab, 3036 Walpole Ln., Baldwinsville, N.Y. 13027; Michael L. Winn, 4219 Ursa Course, Liverpool, N.Y. 13090

[21] Appl. No.: 254,571

[22] Filed: Oct. 7, 1988

[51] Int. Cl.$^4$ .............................................. H04N 3/14
[52] U.S. Cl. ........................... 358/213.31; 358/213.28; 357/30
[58] Field of Search ...................... 358/213.31, 213.29, 358/213.26; 357/30 G, 24 LR

[56] References Cited

U.S. PATENT DOCUMENTS

| | | | |
|---|---|---|---|
| 4,316,221 | 2/1982 | Swab | 358/213.31 |
| 4,434,441 | 2/1984 | Ishizaki et al. | 358/213.31 |
| 4,682,236 | 7/1987 | Wang et al. | 358/213.31 |
| 4,689,688 | 8/1987 | Michon | 358/213.31 |
| 4,734,583 | 3/1988 | Wang et al. | 250/332 |
| 4,734,776 | 3/1988 | Wang et al. | 358/213.31 |
| 4,768,098 | 8/1988 | Vogelsong | 358/213.31 |
| 4,807,038 | 2/1989 | Michon | 358/213.31 |

OTHER PUBLICATIONS

"Characteristics and Readout of an InSb CID Two-Dimensional Scanning TDI Array" IEEE Trans. vol. Ed-22/No. 8, Aug. 1985, Wang et al., (pp. 1599–1607).

Primary Examiner—Jin F. Ng
Assistant Examiner—Stephen Brinich

[57] ABSTRACT

The invention relates to charge injection devices (CID) for sensing IR image intensity information obtained from a two dimensional array of dual-gate sensing sites on an InSb or HgCdTe substrate, and more particularly to a novel push-pull readout circuit which eliminates the pedestal due to capacitive coupling between gates on the same pixel of a dual gate CID. The CID is scanned in rows and read out in parallel columns. Pedestal cancellation is achieved in one example by resetting the prior row as a selected row is injected. In a second example pedestal cancellation is achieved by adding an additional row which is reset as each row is injected, while in a third example a pedestal cancellation network is provided associated with each column output circuit.

5 Claims, 7 Drawing Sheets

FIG. 2 COLUMN VIDEO PROCESSOR (CVP)

A1: OPERATIONAL AMPLIFIER WITH GAIN
A2, A3, A4: UNIT GAIN BUFFER AMPLIFIER

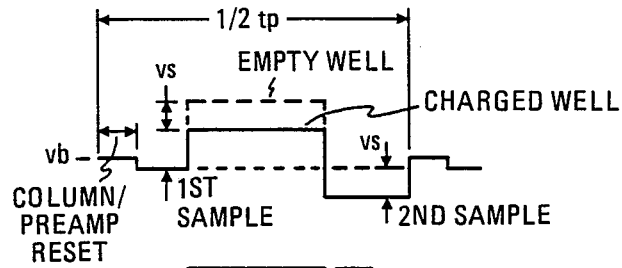
CONVENTIONAL READOUT
FIG. 6A
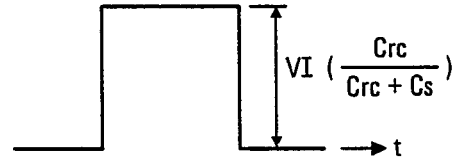
FIG. 6B
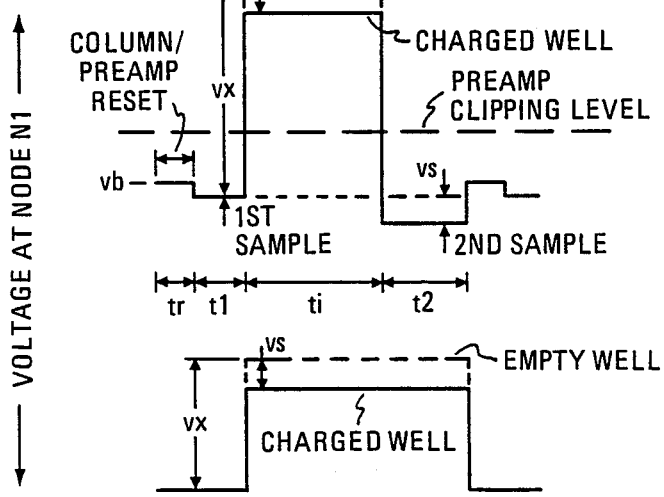
FIG. 6C (A + B)
PUSH – PULL READOUT
FIG. 6D INJECT ROW j (PUSH)
FIG. 6E RESET ROW j-1 (PULL)
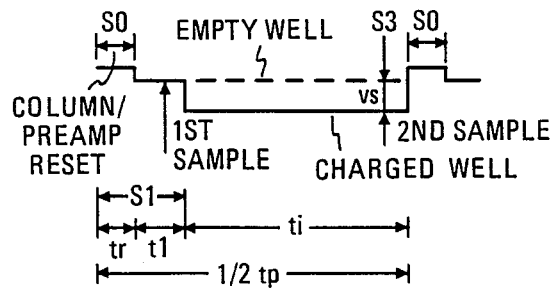
FIG. 6F (D + E)

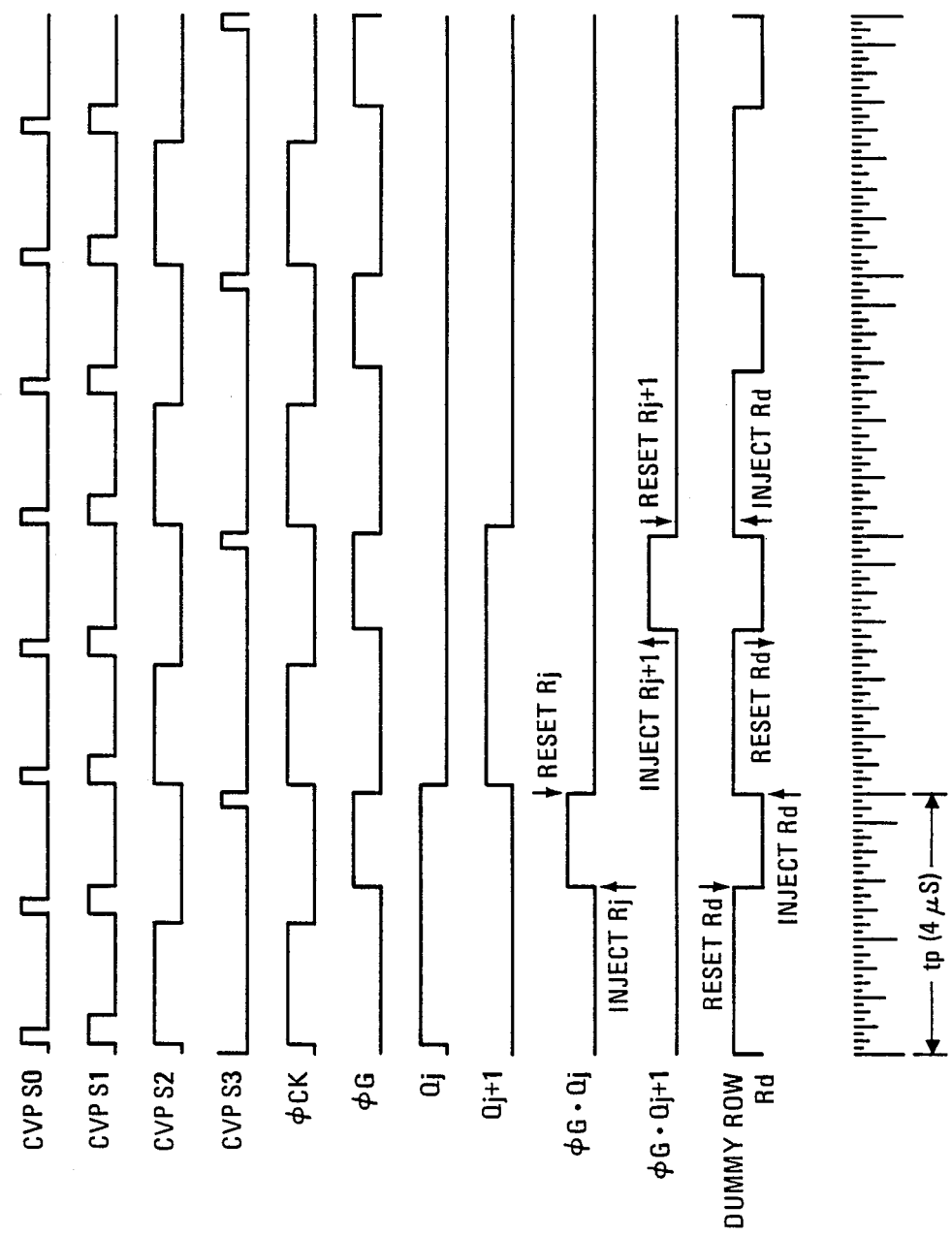

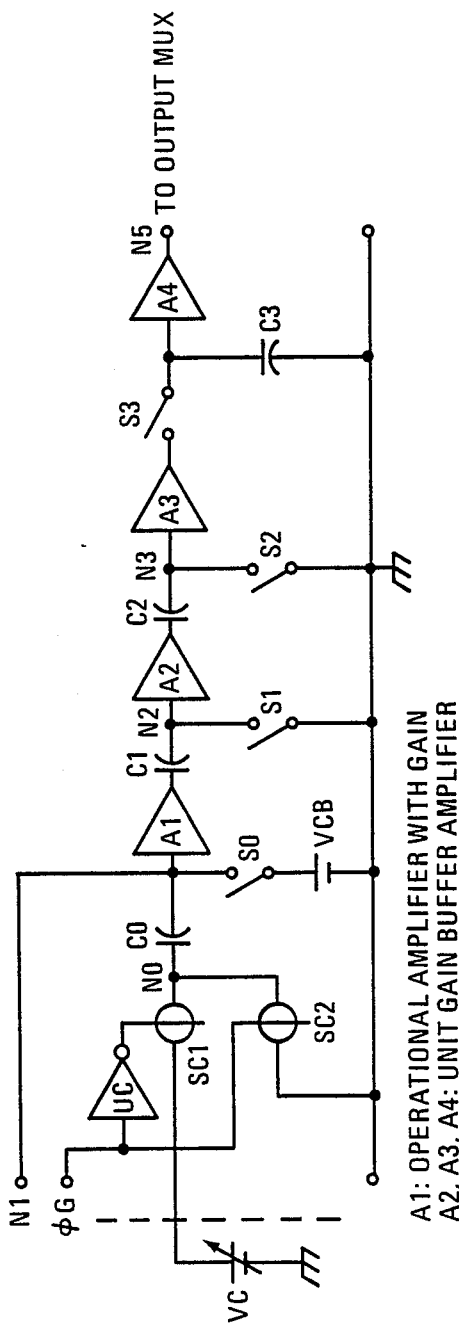
FIG. 9A COLUMN VIDEO PROCESSOR (CVP) WITH EXTERNAL WAVEFORM CANCELLATION
A1: OPERATIONAL AMPLIFIER WITH GAIN
A2, A3, A4: UNIT GAIN BUFFER AMPLIFIER
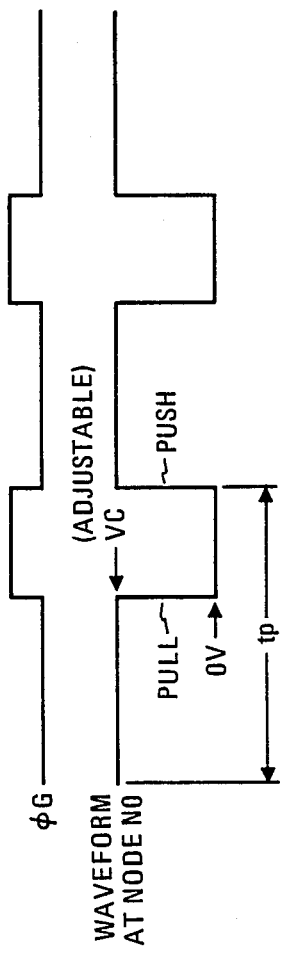
FIG. 9B WAVEFORM AT NODE N0 AND TIMING φG

PUSH-PULL READOUT OF DUAL GATE CID ARRAYS

The invention was made with Government support under Contract No. N00014-85-C-2597 awarded by the Naval Research Laboratory. The Government has certain rights in this invention.

BACKGROUND OF THE INVENTION

1. Field of the Invention

The invention relates to charge injection devices (CID) for sensing IR image intensity information obtained from a two dimensional array of dual-gate sensing sites on an InSb or HgCdTe substrate, and more particularly to a novel push-pull readout circuit which eliminates the pedestal due to capacitive coupling between gates on the same pixel of a dual gate CID.

2. Prior Art

Dual-gate charge-injection device focal plane mosaics are solid-state self-scanned sensors that employ surface charge transfer/injection to achieve full X-Y address capability for area arrays. The pixels are conventionally scanned one row at a time, with separate parallel processing of the columns which is later multiplexed into a serial format. The charge transfer takes place between the row and column sites (and vice versa) at a dual-gate site. Injection represents the injection of charge into the substrate from the dual-gate site accompanied by a flow of charge at the input of the column preamplifier of the readout circuit.

The now well-known Sequential Row Inject (SRI) readout is achieved by placing the inject pulse on the rows, one at a time, and sensing the injected charge on the column. As usual, the desired signal voltage is the change in column voltage as a result of the injected charge, and is obtained by sampling the column voltage before and after the injection pulse by correlated double sampling. A bias charge is always maintained in the potential wells of both row and column.

The success of SRI lies in the fact that charge transfer/injection occurs only once in the selected cell (row) of each column in the sequence of scanning all the rows. The other cells are left undisturbed, thus eliminating the possibility of charge contributions from them and providing greater tolerance to charge-transfer inefficiency due to the classical InSb/oxide interface problem.

The conventional approach to implementing the SRI readout mode in a pixel readout cycle is illustrated in FIG. 6C. The pixel readout cycle starts with a reset of brief duration (tr). The first sample of the correlated double sampling (CDS) process is taken after the waveform has settled from the reset disturbance (t1). The injection (ti) is applied right after the completion of the first sample with only a minimal delay which is required to insure that the leading edge of the injection pulse does not overwhelm the first sample. After injection, an additional delay (t2) is required to allow the trailing edge of the injection pulse to settle (the pause time determines the pre-CDS bandwidth) before the second sample is taken, which concludes the pixel readout cycle. The total pixel readout time tp is then the sum of tr, t1, ti, and t2. For a sequential readout, $tp = Ti/m$, Ti and m being the integration time (or line time) and number of pixels (rows) in the column, respectively.

With the growth in the size of the arrays from $32 \times 32$ to $128 \times 128$ to $256 \times 256$ the quantity m grows from 32 to 128 to 256. On the other hand, the integration time Ti is specified by the system requirement, but is limited to roughly 1.0 millisecond due to array dark current and storage capacity constraint. As a consequence, the available pixel readout time tp is no longer adequate for the normal readout process. Specifically, the injection time ti needs to be at least 1.0 microsecond to minimize the lag caused by incomplete charge injection, whereas low preamp noise requires long settling time (t1 and t2) for narrow pre-CDS bandwidths. Accordingly, the faster the readings, the higher the bandwith requirement of the preamplifier and the greater the sensitivity to input noise.

In the actual implementation of the conventional SRI readout, there are other complications. High performance sensor systems normally use CMOS parallel video processor (PVP) chips on the focal plane. The coupling of the injection pulse from row to column (preamp input) causes a pedestal which is usually large enough to saturate the amplifier chain. Consequently, waveform settling does not start during the "dead time" until the amplifiers recover from saturation.

The problem forces the preamplifier to be designed to handle a greater dynamic range. The other complication associated with the sample-after-inject readout is the CID noise due to tunneling breakdown which reduces the ultimate sensitivity of the array to weak IR radiation.

SUMMARY OF THE INVENTION

Accordingly, it is an object of the present invention to provide improved readout in a two dimensional IR sensing array.

It is another object of the present invention to provide in a two dimensional IR sensing array, readout in which the demands of greater dynamic range and wider bandwidth upon the preamplifier are reduced.

It is still another object of the invention to provide in a two dimensional IR sensing array, readout in which injection breakdown effect is minimized in the interest of reducing dark current noise.

These and other objects of the invention are achieved in an IR sensitive charge injection device (CID) comprising an IR sensing array and a novel readout circuit.

The array comprises a substrate of IR sensitive semiconductor material supporting an interfacing layer of insulating material and on which m rows by n columns of pixel sites forming charge storing potential wells are arranged, each site having a conductive row gate connected in successive row lines and a conductive column gate connected in successive column lines. The charges at a site are free to flow at the interface between the column gate and row gate in the presence of a bias potential, the configuration providing between the row gate and column gate at each pixel site a capacitive coupling (CRC) which gives rise to an undesired pedestal in the output waveform.

The readout circuit, in accordance with a first embodiment of the invention, comprises a source (VRT) of row transfer potentials and individual row transfer switches for injecting signal charge into the substrate and transferring charge via the column line during readout the row selection process being controlled by a pair of shift registers, one for odd and the other for even rows.

Row reset is achieved by means including a source (VRB) of row bias potentials and individual row bias reset switches for establishing the charge storing potential wells at the row gates and for facilitating charge exchange between column and row gates at a site.

In accordance with a first embodiment of the invention, two complimentary reset waveforms are provided for odd and even rows respectively, each having alternate highs and lows of one pixel period duration. The reset waveforms are timed in relation to injection, such that as row bias is removed and the injection voltage applied to a given jth row, the (j−1)th row is reset with the effect of cancelling the pedestal.

The readout circuit further comprises n column video processors, each having a gain amplifier coupled to the (kth) column line, and a source (VCB) of column bias potentials and a controllable column bias reset switch (S0$_k$), for establishing the charge storing potential wells at the column gates and for facilitating charge exchange between column and row gates at a site. Means are also provided to take a correlated double sample including a first switch (S1$_k$) used in taking a first sample and second switch (S3$_k$) used in taking the second sample, correlated to the first.

The configuration further comprises a timing generator for timing the operation of the CID. In particular, the switches S0$_k$ and S1$_k$ are closed to reset the kth column line to start readout of each row, switch S0$_k$ being opened after resetting, with switch S1$_k$ being opened to obtain a first sample before injection. Next the row transfer switch (TS$_j$) is closed to inject signal charge into said substrate and to transfer charge to the column gates. Before injection is finished by opening closed to obtain a second sample correlated with the first sample and complete readout of the jth pixel.

As earlier stated, the resetting of the j$^{th}$ row, simultaneously with injection of the (j+1)$^{th}$ row, produces oppositely sensed pulses due to the capacitive coupling (CRC), the cancellation eliminating the extraneous injection pedestal and reducing the voltage excursion at the input of the column video amplifier. The taking of the second sample within the injection period facilitates narrow bandwidth operation of the preamplifier and lower noise for the same readout rate.

In accordance with a second embodiment of the invention, an additional row of pixel sites optically and electrically like the other rows is provided. The readout circuit is modified to provide an additional row transfer switch (TSd) and an additional row bias reset switch (RSd). The row selection means includes a single shift register for controlling the row transfer switches and row reset switches of the 1−m rows. The row bias reset switch (RSd) connects the additional row line to the bias source simultaneously with the injection of each row selected by the register and the row transfer switch injects the additional row line simultaneously with the reset of each row selected. The result is cancellation of the injection pedestal and a reduction of the voltage excursion on all column lines.

In accordance with a third embodiment of the invention, a pedestal cancellation network is provided as part of each column video processor. It includes pedestal cancellation voltage source (VC), a coupling capacitor connecting the network to the column line, a first pedestal cancellation switch connected between the source (VC) and the coupling capacitor, and a second pedestal cancellation switch connected between ground and the coupling capacitor controlled through an inverter to maintain an opposite state to the first pedestal cancellation switch. The two pedestal cancellation switches operate simultaneously with injection and the resetting of each row to cancel the injection pedestal and reduce the voltage excursion on all column lines.

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings, in which:

FIG. 2 is a circuit diagram of a column video processor suitable for use in the CID illustrated in FIG. 1;

FIGS. 6A, 6B and 6C deal with conventional readout and FIGS. 6D, 6E and, 6F deal with push-pull readout as exhibited by the first embodiment; FIG. 6A showing a conventional readout waveform using correlated double sampling modified by omitting the pedestal occurring between the first and second sample; FIG. 6B is an illustration of the pedestal alone of a conventional array readout waveform; and FIG. 6C is an illustration of the conventional composite readout waveform (with the pedestal present); FIG. 6D shows the positive going pedestal appearing in Applicant's novel arrangement when row j is injected (as in each embodiment) to provide the "push" part of the readout operation; FIG. 6E illustrates the negative going pedestal when the j−1(th) row is reset (as in the first embodiment) to provide the "pull" part of the readout operation, and FIG. 6F illustrates the composite output waveform the jth pixel assuming push-pull operation;

FIG. 8 is an illustration of the scanning and readout control waveforms used in the second embodiment, and FIG. 9A is an illustration of a third embodiment of the invention in which the undesired pedestal in the array output waveform is eliminated by push-pull operation using a single network associated with each column video processor, and FIG. 9B is an illustration of two waveforms applicable to the third embodiment.

DESCRIPTION OF THE PREFERRED EMBODIMENT

Figure 1:
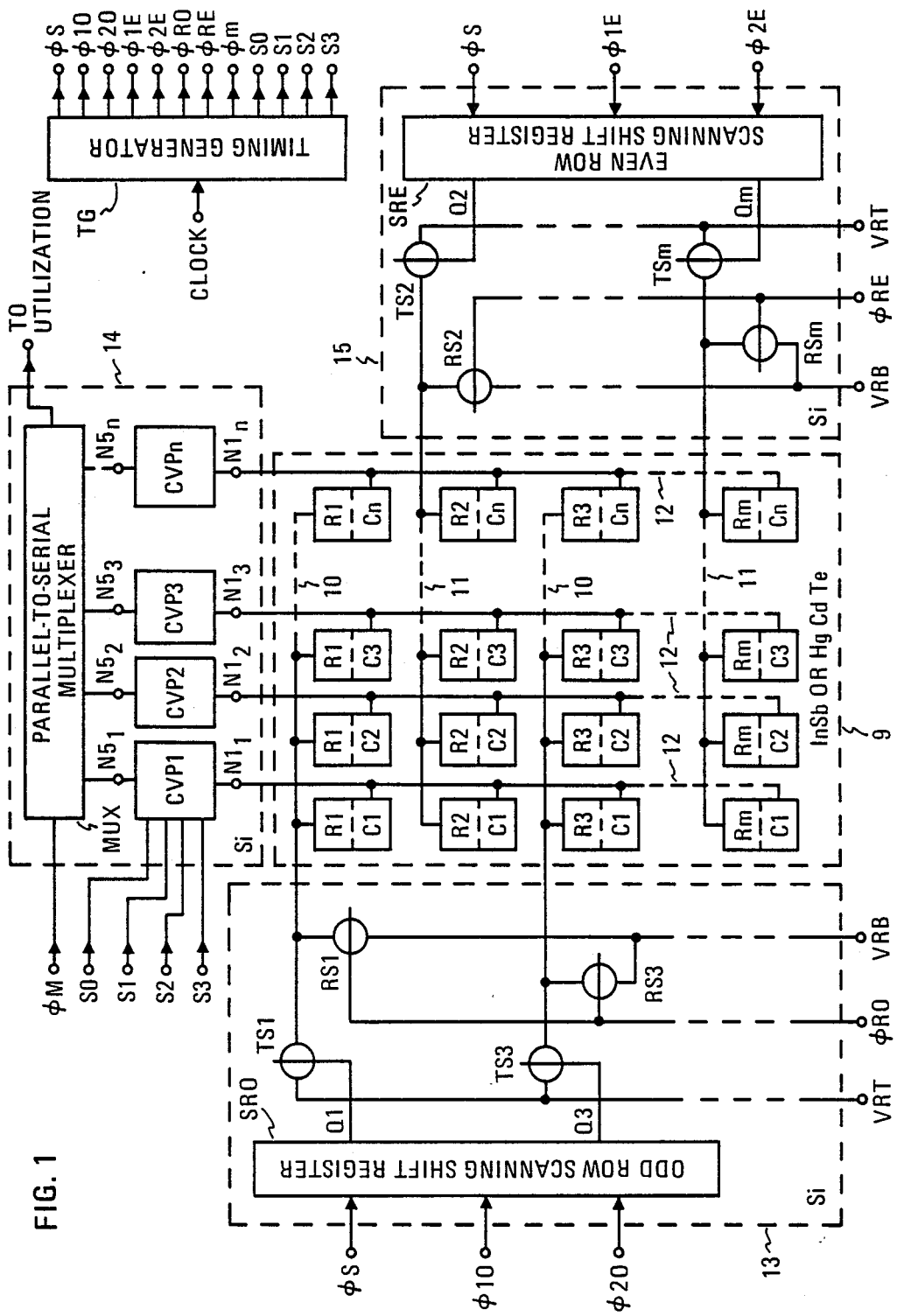
FIG. 1 is a circuit diagram of an IR sensing charge injection device (CID) comprising a two dimensional array of dual gate sensing sites on an InSb or HgCdTe substrate and a novel push-pull readout eliminating from the array output waveform the undesirable pedestal due to capacitive coupling between a row site and a column site on individual pixels in accordance with a first embodiment of the invention.

Referring now to FIG. 1, a charge injection device (CID) for infrared (IR) imaging is shown. The CID comprises an IR area sensor array of dual gate charge storage sites combined with a novel readout. The novel readout has a principal advantage of requiring less dynamic range of the preamplifiers by eliminating the pedestal normally present in the CID output waveforms due to injection pulse coupling, and lower preamplifier noise, and lower CID dark noise as will appear in the following discussion.

The sensor array 9 comprises a substrate of IR sensitive semiconductor material, typically Indium antimonide (InSb) or mercury cadmium telluride (HgCdTe) supporting a layer of insulating material typically silicon dioxide ($SiO_2$) or zinc sulfide (ZnS). A conductive row gate and a conductive column gate are coupled to form a pixel site, each gate defining a capacitive cell including the underlying portions of the insulating layer and of the semiconductor substrate. In the FIG. 1 illustration, the array consists of m rows and n columns of dual gate sites. Each site thus defines a common region consisting of two contiguous capacitive cells in which optically induced electron-hole pairs may be created by photons, and between and within which the charges are free to move. Customarily, the charges accumulate at the interface between the insulating material and the semiconductor material, and flow freely from the column cell to the row cell and vice versa, normally under the influence of voltages applied to the row and column gates. All the row gates in one line are interconnected by an odd or even conductive row line (10 or 11), and all the column gates in one column are interconnected by a conductive column line 12. Accordingly, m row lines and n column lines are provided for connection of the array to the readout circuit.

The readout circuit shown in FIG. 1 may be partitioned into four means (13, 14, 15 and TG). The odd row selection means 13 is connected to the odd row lines 10 of the sensor array. The even row selection means 15 is connected to the even row lines 11 of the sensor array. The means 14 derives parallel information from each column line (12), and as each row is selected for injection, combines the parallel streams of column data into a single serial stream representing the line output of the full sensor array. The means (TG) times the operation of the CID including the means 13, 14 and 15.

The odd and even row selection means 13 and 15, include connection to a source of row bias potentials (VRB) and m controllable row bias reset switches ($RS_{1-m}$); connections to a source of row transfer potentials (VRT) and m controllable row transfer switches ($TS_{1-m}$); and two shift registers (SRE,SRO) each having m/2 outputs at which a control pulse ($Q_j$, $Q_{j+1}$ etc.) appears for sequentially selecting single rows for injection in the readout process.

Figure 5:
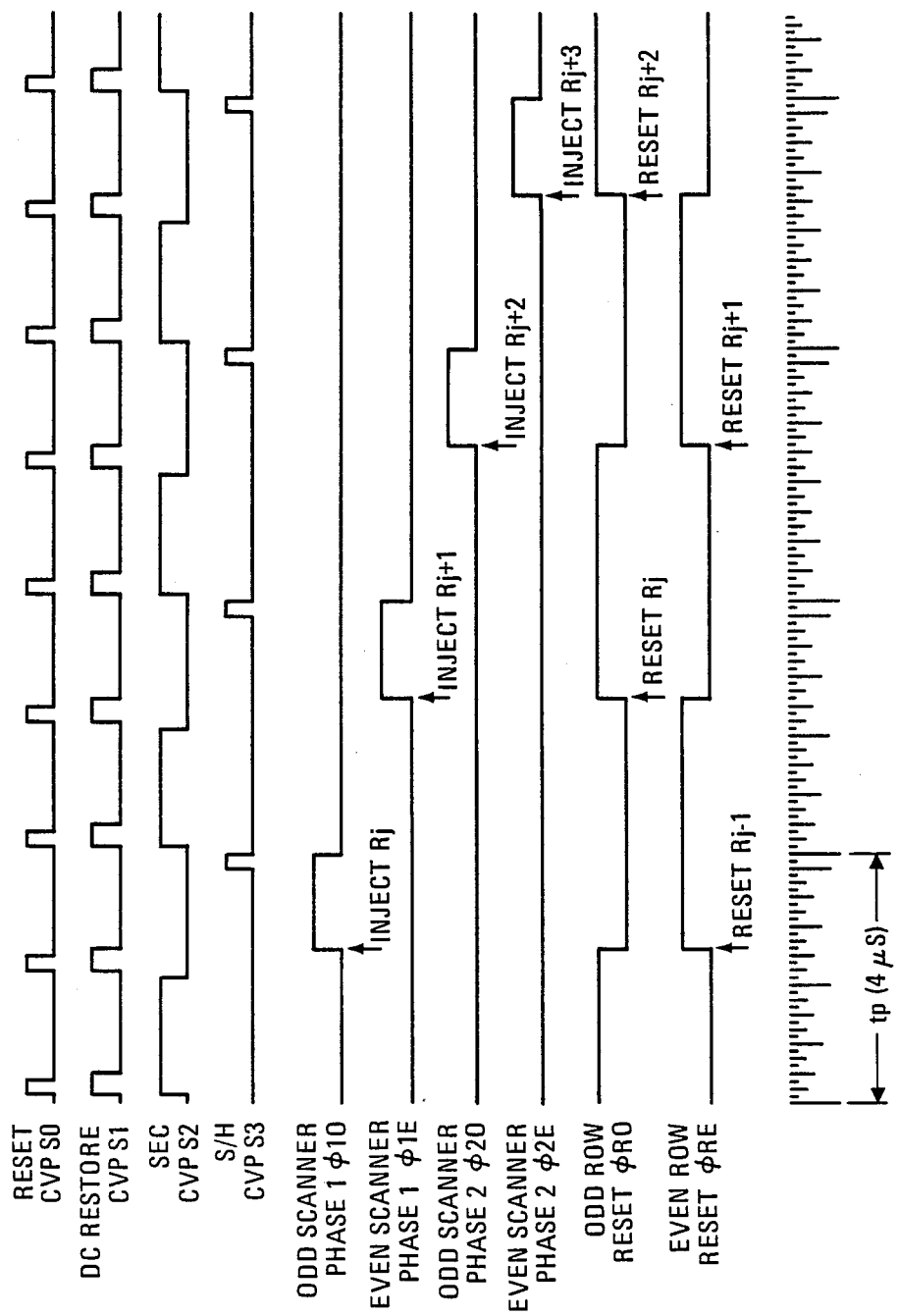
FIG. 5 is an illustration of the scanning and readout control waveforms used to provide push-pull readout to eliminate undesired pedestals from the array output waveform.

The sequential odd row selection means 13 operates successive odd rows of the sensor array 9. The odd row scanning shift register (SRO) which is implemented by a PMOS or NMOS dynamic bootstrap circuit controls odd row selection, under the control of the clock (phi 10, phi 20) and the sequence starting pulse (phi S), which are supplied from the timing generator (TG), yet to be described. The waveforms are shown in FIG. 5. Each jth output ($Q_j$) of the odd row shift register is connected to control an odd row transfer switch ($TS_1$, $TS_3$, etc.). The source of row transfer potentials (VRT) is connected to a first terminal of all of the odd row transfer switches ($TS_{1-(m-1)}$). The second terminal of each odd row transfer switch ($TS_j$) is connected to the corresponding jth row of the array 9.

As seen in FIG. 5, the odd row scanner (SRO) produces a high on odd pixel periods, the waveform being confined within the second half of the pixel period. The waveforms on $Q_1$, $Q_3$, etc., define successive odd periods of injection as the odd row lines of the array are scanned. Similarly the even row selection means (SRE) produces waveforms on $Q_2$, $Q_4$, etc., for operating successive even rows of the sensor array. The even row selection means (SRE) produces a high on even pixels periods confined within the second half of the pixel period, which define successive even periods of injection as the even row lines of the array are scanned.

The reset switches are also grouped into even and odd groups. The source of row bias potential (VRB) is connected to a first terminal of all of the row bias reset switches ($RS_{1-m}$). The second terminal of each reset switch ($R_j$) is connected to the corresponding jth row of the array. The odd reset waveform phi RO, which is supplied by the timing generator, and which goes high once each even pixel period is connected to control the odd reset switches ($RS_{1-(m-1)}$). Similarly the even waveform phi RE, which goes high once each odd pixel period is connected to control the even reset switches ($RS_{2-m}$).

Reset of the odd and even rows occurs alternately with the duration of reset being high for one pixel duration and low for one pixel duration, the resetting being timed, in accordance with the invention, such that resetting of the (j−1)th row begins at the same instant that injection of the jth row occurs.

Summarizing the array, the odd row selection means 13 sequentially selects the first elements in all the columns for injection, the even row selection means 15 sequentially selects the second elements in all the columns for injection, alternative with the odd row selection means and concluding with a selection of the mth (i.e. last) elements in all of the columns, after which the row selection cycle repeats. Resetting meanwhile occurs on every other row line, once every two pixel durations.

The means 14 of the readout circuit comprises n column video processors ($CVP_{1-n}$), each connected to a column line 12 for deriving parallel information as each row is selected and a parallel to serial multiplexer (MUX) usually arranged to form one serial data stream.

Each column video processor ($CVP_k$) as shown in FIG. 2 comprises four amplifiers ($A1_k$–$A4_k$), three capacitors ($C1_k$–$C3_k$), four switches ($S0_k$–$S3_k$), and a source of column bias potentials (VCB). Five nodes ($N1_k$, $N2_k$, $N3_k$, $N4_k$, $N5_k$) useful in circuit description are present in the video processor: the node ($N1_k$) representing the input and the node ($N5_k$) representing the output, and the nodes ($N2_k$, $N3_k$, and $N4_k$) representing internal nodes. Each input node ($N1_k$) is coupled to a correspondingly numbered column (12) of the sensor array 9. Each output node ($N5_k$) is coupled to a correspondingly numbered input of the parallel to serial multiplexer (MUX).

The column video processor is connected to obtain a correlated double sample at each site in the array corrected for subtractive error. The input node ($N1_k$) is connected to the input of gain amplifier ($A1_k$). The input node is also connected via the column bias reset switch ($S0_k$) and the source of column bias potential (VCB) to ground. The switch ($S0_k$) and source (VCB) act to reset the node ($N1_k$) to bias potential. The output of amplifier (A1$_k$) is connected via capacitor (C1$_k$) to the node at the input of a buffer amplifier (A2$_k$), typically of unitary gain. The node (N2$_k$) is connected to ground by the switch ) which in cooperation with the capacitor (C1$_k$) provides for dc referencing of the signal sample. The output of the amplifier (A2$_k$) is connected via the capacitor (C2$_k$) to the node (N3$_k$) at the input of the buffer amplifier (A3$_k$), also typically of unitary gain. The node (N3$_k$) is connected to ground via the switch (S2$_k$) which in cooperation with the capacitor (C2$_k$) provides for subtractive error correction.

Continuing with a description of the column video processor, th output of the buffer amplifier (A3$_k$) is connected via the switch (S3$_k$) to the node (N4$_k$) at the input of the output buffer amplifier (A4$_k$), also typically of unitary gain. The capacitor (C3$_k$) is connected between the node (N4$_k$) and ground. Switch (S3$_k$) in combination with the capacitor (C3$_k$) provides for sampling and holding the signal, dc referenced, and corrected for subtractive error. The output of the buffer amplifier (A4$_k$) which is a correlated double sample corrected for substractive error is then supplied to the kth parallel input of the parallel-to-serial multiplexer (MUX) where it is combined with the outputs of the other buffer amplifiers of the other column video processors to form a suitable signal for application to the display apparatus.

The readout circuit is completed by the timing generator (TG) which has outputs shown in FIG. 5 for timing the operation of the odd and even row scanning shift registers (phi S and phi 10, phi 20; phi 1E; phi 2E and phi RO; phi RE), the operation of the switches (S0, S1, S2, and S3) of the column video processors and the operation of the MUX (phi M).

The readout circuit (13, 14, 15 and TG) scans the array imager 9 in accordance with a method known as sequential row injection (SRI), which has been further modified as will be discussed below. The known SRI method together with certain limitations of that method are described in a paper entitled "Characteristics and Readout of an InSb CID Two Dimensional Scanning TDI Array" by Samuel Wang et al, appearing in the IEEE Transactions on Electron Devices, Vol. ED 32, #8, August 1985. The readout of the imager in the present FIG. embodiment generally follows the sequence described in FIG. 9 of U.S. Pat. No. 4,316,221 of John Swab, filed Aug. 5, 1980 and entitled "Apparatus for Sequential Row Injection Readout of CID Imagers". The readout in the present FIG. 1 embodiment incorporates subtractive error correction as set forth in U.S. Pat. No. 4,734,583 of Wang et al filed Oct. 16, 1986 and entitled "Readout Circuit for Dual-gate CID Imagers With Charge Sharing Corrected for Subtractive Error". The present embodiments depart from the prior methods in respect to the novel push-pull readout technique.

The scanning sequence of the first embodiment begins with the generation by the timing generator (TG) of a starting pulse (phi S) coupled to the odd and even shift registers (SRO), (SRE). The starting pulse initializes the shift registers which start the count by selecting successive odd and even row sites for readout. The odd shift register 13 is scanned with the odd two phase timing waveforms phi 10 and phi 20, while the even shift registers 15 is scanned with the even two phase timing waveforms phi 1E of phi 2E. The shift registers count the, rows in a consecutive numerical sequence until the final row (m) is selected and read out as will be explained below.

It is essential that all sites on the array under the row and column gates be maintained at a suitable state to integrate photon induced charges as the scanning proceeds until readout occurs. This requirement must be maintained consistently with the transfer of charge that occurs from row to column gates, and with the injection of charge into the substrate which occurs when the site is read out.

Every site on the array under a row gate is held at the row bias potential (VRB) except when the row has been selected for readout. When the row is selected, the row bias is released, injection is applied via row transfer voltage (VRT), VI=VRT−VRB, and then the row bias is reapplied. Maintaining a constant integrating bias voltage on the MIS (metal-insulator-semiconductor) sites sustains the integration of optically induced charges by maintaining the depth of the potential well under the row gates. The constant integrating bias is achieved by resetting the row bias every second pixel period. The bias charge serves to keep the interface states and traps filled to avoid the inhibiting effect on rapid charge transfer between row and column gates.

Similarly at every site on the array under a column gate, a column bias potential is recurrently applied for the same purposes. The column bias is applied at the pixel rate (once or twice every pixel readout time, tp) as shown in FIGS. 5 and 8. The column bias is portrayed by the uppermost timing waveform, which takes the form of a short duration pulse (S0). The column bias reset pulse occurs on all column sites, whether being read out or not, and this maintains the potential well essential to charge integration under the column gates.

The readout occurs one site at a time, all sites in the same row (but different columns) being read out before proceeding to the succeeding row. As previously explained, a single row of sites is selected for injection by the shift register (SRO or SRE). The column selection of a site is achieved via the n fold plurality of column video processors (CVP$_{1−n}$) and the parallel-to-serial multiplexer (MUX) to which they are connected. Each video processor, after the signal has been obtained, holds the signal at the output nodes (N5$_{1−n}$) for readout by an input of the parallel-to-serial multiplexer. The multiplexer (MUX) then scans the n-fold columns at a sufficiently high rate to obtain signals from all the columns before a new row is selected by the shift register. The method obtains only refreshed site readings for eventual utilization.

Figure 3:
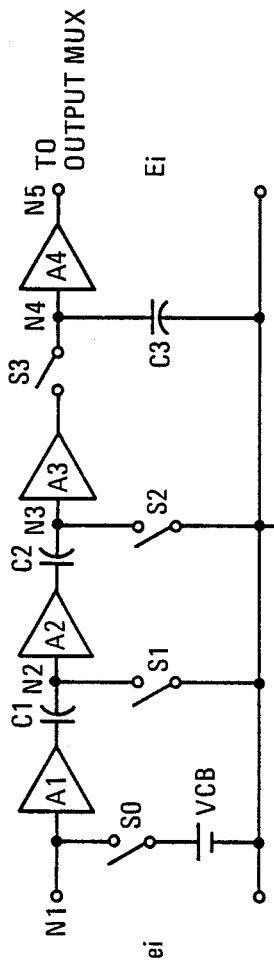
FIG. 3 is an equivalent circuit of a pixel showing the capacitive coupling between a row site and a column site on an individual pixel.

FIG. 3 equivalently represents the sensor site as a three terminal, seven component device. The row bus terminal, column bus terminal, and the substrate form the three terminals.

The oxide capacitance of the row gate CRO is connected in series with the row depletion capacitance CRD between the row bus terminal and the substrate. Similarly the oxide capacitance of the column gate CCO is connected in series with the column depletion capacitance CCD between the column bus terminal and the substrate. The interface at the interconnections between CRO and CRD and between CCO and CCD is further shunted by an ideal diode D in series with a variable voltage VD to the substrate. The shunting elements are attributable to the stored charge in the potential well created by a suitable reverse bias VRB. The equivalent circuit implies that when the variable potential well disappears the battery VD back biasing the diode D will also disappear. This allows the diode D to be conductive for current flowing into the substrate and to act as a short circuit in shunt with CRD and CCD. The equipotential state at the common interface requires close coupling between the row and column gate at each site, and as a consequence the two gates are designed to have an overlap resulting in a significant capacitance CRC between the row and column gates at a single site, and between the respective row and column terminals. At the end of each integration cycle, an injection voltage is applied to the selected row, as shown in FIG. 3,

VI=VRT−VRB where VRB and VRT are the row bias and transfer voltages. The injection pulse is coupled through CRO to the insulator-semiconductor interface of the dual sites, causing the charge on the row site to transfer to the column site and eventually be injected to the extent of the "signal" charge capacity. The diode in FIG. 3, which connects the interface to the substrate (ground) via the variable voltage source VD, serves as a switch upon injection and the switching time during the leading edge of the injection pulse is dependent on the amount of charge injected. This is, of course, a piecewise linear approximation to a nonlinear system since the depletion capacitance (CCD and CRD) is a function of the semiconductor doping density, injection voltage, and fullness of the potential well. The change in the surface potential due to row injection is further coupled through CCO to the column gate as illustrated in the waveform vs of FIG. 6A.

Readout, according to the method described in U.S. Pat. No. 4,734,583, entails the taking of a double sample—"correlated double sampling" from a site at a selected row and column. The known sampling process is illustrated in FIG. 6A. The first sample is taken following the reset pulse and pausing for a short period after the reset pulse and pausing for a short period after the reset pulse to allow the voltage at the site to stabilize. An injection pulse is next applied for injecting the charges stored at the site into the substrate and thereby emptying the well. The second sample is taken shortly after injection, pausing again for a short period to allow the voltage at the site to stabilize. The second reading represents a difference between the initial and final states and is held for acquisition by the multiplexer. The time required for reading out a pixel is typically from two to four microseconds.

The waveform illustrated in FIG. 6A is an ideal waveform neglecting the presence of the capacitance CRC. In reality, the injection pulse that appears on the row bus terminal 10 or 11 in FIG. 3 also couples through the capacitance CRC to the column bus terminals 12, in proportion to VI CRC/(CRC+CS), as illustrated in Fig. 6B. Although the column shunt capacitance CS is typically much larger than CRC, in a practical situation the coupled injection pulse (FIG. 6B) can be several times larger than the signal voltage vs (FIG. 6A). The resulting waveform (FIG. 6C) that appears at the column bus terminal 12 is the combination of FIG. 6A and 6B, making the dynamic range requirement of the preamp A1 in CVP several times larger than what is necessary for linear response to the signal voltage vs.

The video processing carried out by the column video processor CVP, is illustrated by the timing in FIG. 6C. In an elemental readout interval ($\frac{1}{2} t_p$), both of the time periods $t_r$ and $t_i$, which are allocated for bias reset and injection respectively, have a minimum duration requirement consistent with the charge injection response time. The rest of the readout interval is for the settling time required preliminary to the first sample ($t_1$) and for the settling time required preliminary to the second sample ($t_2$). Should the leading edge of the coupled injection pulse saturate the preamplifier (A1) in the column video processor, there is a period following the trailing edge of the injection pulse before the preamplifier can recover from saturation and respond to the step disturbance prior to a second reading. The effect of saturation is either to force an increase in the settling time or to require a faster amplifier response to a shorter settling time. Since the bandwidth of the preamplifier must be increased as the available settling times for the reset pulse and the injection pulse disturbance are reduced, this conventional readout approach requires wider bandwidth operation for shorter settling times, which leads to inferior noise performance.

The other implication associated with the sample-after-inject readout is the CID noise due to tunneling breakdown. Injection pulses serve two purposes in the CID: reading out the integrated charge and refreshing the pixel storage capacity. The storage capacity, often referred to as the potential well, is re-established by the trailing edge of the injection pulse, at which moment the surface potential reaches maximum in the readout cycle. Since the infrared system requires a large dynamic range, the storage capacity is usually stressed by a large injection voltage. A high surface potential results right after the injection trailing edge, leading to tunnel breakdown. As dark charge, as well as photon-generated charge, accumulates, the surface potential decreases and the breakdown phenomenon in turn subsides. The hectic breakdown charge generation right after injection, however, is a noisy process, which is attributable to the large noise observed in this sample-after-inject readout. The effect of this noise is to reduce the ultimate sensitivity of the array to weak IR radiation.

In accordance with the invention, the extraneous CRC coupled injection pulse which appears between the intervals when the first and second samples are taken to obtain the true signal is cancelled. As already noted, this reduces the required dynamic range of the preamplifiers in the column video processors. In addition, the new approach facilitates narrower bandwidth operation for the same readout rate, leading to lower preamplifier noise. Finally, it provides relief in CID dark current noise under the injection breakdown condition.

These advantages are accomplished by sampling the signal voltage during injection to eliminate the second settling-time period and by concurrently removing the extraneous CRC coupled pedestal by "push-pull" injection, as illustrated in FIGS. 6D, 6E and 6F.

Figure 4:
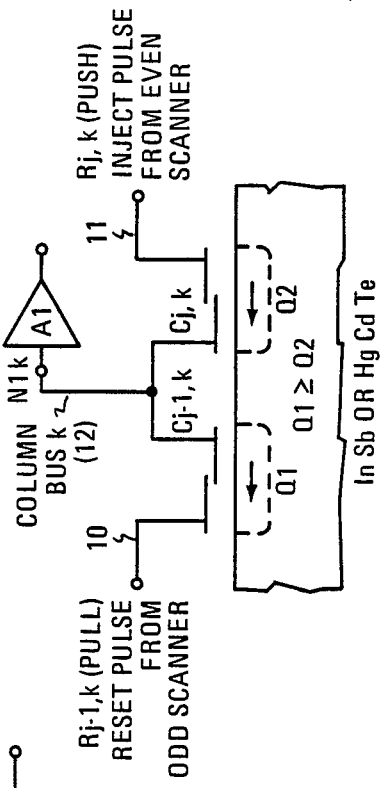
FIG. 4 is an illustration showing the structures of a pair of adjacent pixels on the same column giving rise to the capacitive coupling which produce undesired pedestals and illustrating schematically the push-pull readout used to cancel the undesired pedestals from the array output waveform.

Push-pull injection in readout of the jth row cell in each column involves injecting the jth row gate (push) and resetting the (j−1)th row gate (pull) at the same time as illustrated in FIG. 4. Injecting the jth row gate produces on the column bus terminal a voltage excursion equal to a constant defined by the empty-well condition less an amount proportional to the injected charge (FIG. 6D). Resetting the (j−1)th row gate re-establishes the potential well for the next integration cycle and causes an opposite voltage excursion on the column bus terminal equal to the empty-well constant (FIG. 6E). Since the two events are now arranged to take place simultaneously, the two oppositely sensed pulses both due to CRC coupling and both of which appear on the same column bus 12, partially cancel each other.

The remainder of the push-pull cancellation is a voltage swing proportional to the injected charge (FIG. 6F), which may be sampled toward the end of the injection pulse. Since the transient in the present arrangement, which might preclude an accurate reading, occurs at the beginning of the injection pulse, and thus has the injection period to settle, and since the transient is in fact quite small due to cancellation, a separate settling time (t2) is not required for taking the second sample. Thus both injection and the settling for taking the second sample may proceed during the same time interval, as illustrated in FIG. 6F. The result is improved performance in the respects mentioned above, and with improved performance, the possibility of reducing the pixel time in the interests of facilitating faster readout of larger arrays.

A detailed timing waveform for the overall scanning process is shown in FIG. 5. The FIG. 5 illustration illustrates the waveforms required for the readout and scanning operation. The odd and even scanner waveforms are illustrated over four pixel times (tp). Thus the odd scanner phase 1 and phase 2 waveforms, and the even scanner phase 1 and phase 2 waveforms are illustrated corresponding to four pixel times. These correspond to the jth, (j+1)th (j+2)nd and (j+3)rd pixels. Thus for the jth pixel, resetting occurs by the even scanner reset pulse ($R_{j-1}$), which like all reset pulses, is of a full pixel duration. Thus charge integration of the jth pixel is delayed by a full pixel period until the beginning of the jth reset pulse as noted above. The waveforms for injecting the (j+1)th, (j+2)nd, and (j+3)rd pixels occur simultaneously with resetting the jth (j+1)th and (j+2)nd pixels, respectively, as illustrated in FIG. 5.

Since the potential well of the (j−1)th row is not reset immediately following injection (for readout of (jth row) but is delayed until the injection of the jth row there is a dead time period as suggested above. This brief dead time negligibly degrades the detector responsivity by reducing the charge integration time by the fraction 1/m, m being the number of rows in a column. Typically m is 64, 128, 256 or 512. The reduced charge integration time is negligible in all such cases.

The column video processor readout (CVP) waveforms S0, S1, S2 and S3 also illustrated in FIG. 5, operate the column video processors in a manner more fully described in U.S. Pat. No. 4,734,583. In the cited video processor four successive samples are taken to correct for "subtractive error". Subtractive error occurs during the brief interval that the charge sharing mode occurs during readout and is attributable to charge integration existing between the taking of the two successive samples preceeding and following injection which become the third and fourth samples. In accordance with the teaching of the cited patent, the first two samples are taken during the first half of the pixel time, (i.e., during SEC waveform S2) in order to obtain a correction term prior to taking the third and fourth samples. The correction term is stored until injection occurs, and applied to the later pair of samples. The present push-pull readout, which involves the double sample taken before and during injection and corresponding to the third and fourth samples of the cited arrangement, may be applied to systems not providing subtractive error correction as well as to systems which do.

In the first embodiment the injection pulse of the (j+1)th row couples to the column bus by virtue of the row to column capacity CRC and produces an initial positive going transient on the column bus, at the amplifier input node N1. The reset waveform on the jth row entails an initial negative going transient on the column bus which cancels the pedestal at the amplifier input node. The cancellation continues through the taking of the second sample during pulse S3 and the injection ends with reset which clamps the amplifier input to the column reset voltage VCB. The pedestal is thus eliminated at the amplifier input.

Figure 7:
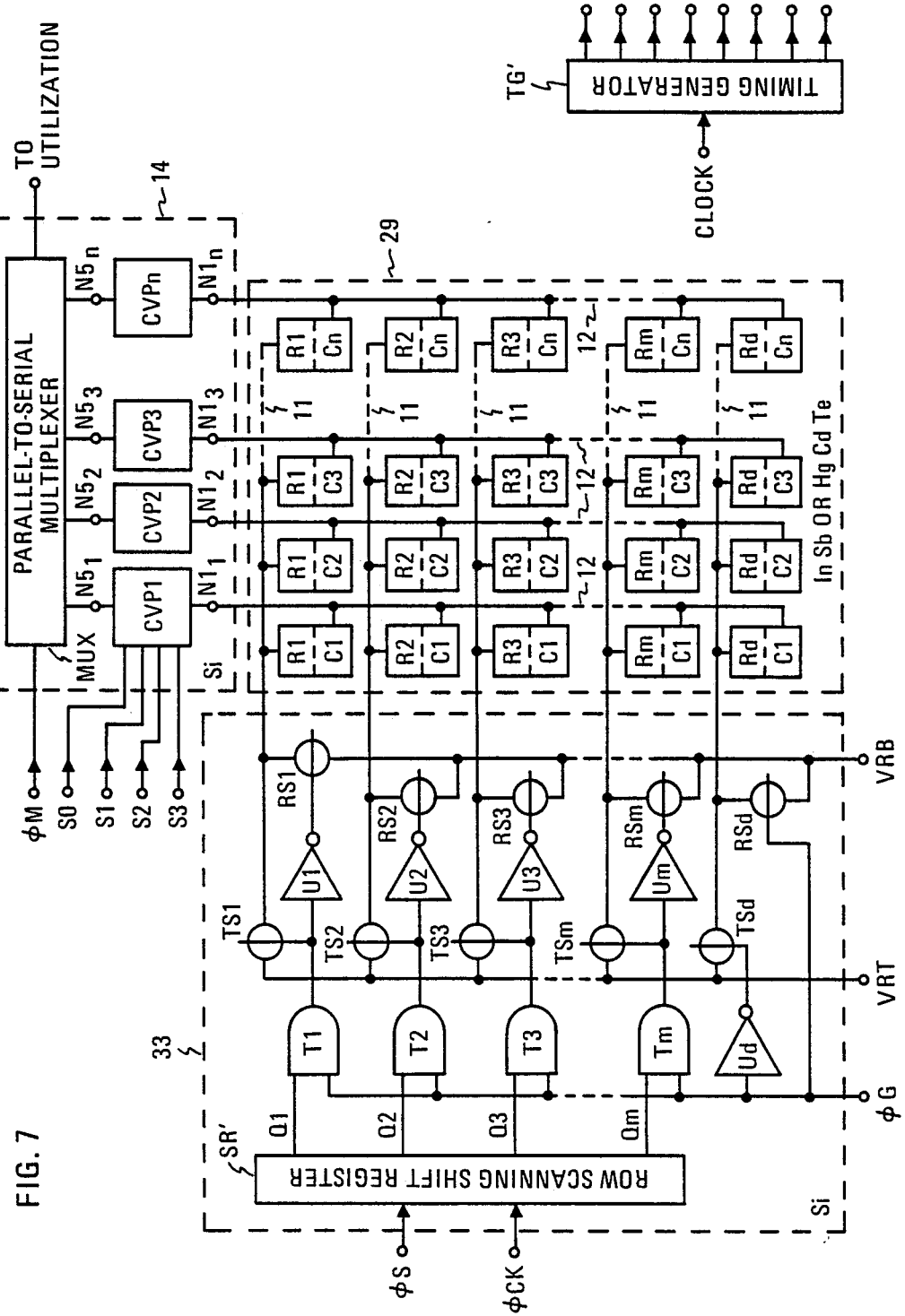
FIG. 7 is an illustration of a second embodiment of the invention in which the undesired pedestal in the array output waveform is eliminated by push-pull operation using a row of dummy pixels on the array.

In the second embodiment of FIG. 7. a similar compensation occurs in which the injection push of the selected jth row is simultaneously opposed by the reset of a dummy row, and the injection of the dummy row is simultaneously opposed by the reset of the selected jth row. The effect at the column preamplifier is also one of complete cancellation of the pedestal from the column bus at the amplifier input node N1.

In the second embodiment, the row of dummy pixels are electrically and optically similar to the active pixels in the array, but are subject to recurrent injection and resetting at the pixel interval, so that there is minimal opportunity to integrate optically induced charges, and the potential wells are essentially empty.

The dummy pixels form an additional row at the end of each column of the array, these pixels having a row notation "Rd" with successive column notations "C1 to Cn".

In the second embodiment, the array readout circuit may be partitioned into three means 33, 14 and TG'. The means 14, consisting of the column video processors (CVP 1−n) and multiplexer (MUX) may be the same as in the first embodiment.

The timing generator (TG') supplies the waveforms (S0, S1, S2 and S3) to the column video processors of the parallel readout means 14 as before, but is modified to control the single row scanning shift register 33 which controls the active pixels and the switches which control the row of dummy pixels.

The row injection means 33 consists of a row scanning shift register SR', AND gates $T_{1-m}$; inverters $U_{1-m}$, transfer switches $TS_{1-m}$, reset switches $RS_{1-m}$; and for the row of dummy pixels, an inverter Ud, a transfer switch TSd, and a reset switch Rd.

The shift register SR' may be a CMOS dual rank master slave flip-flop register. The row scanning shift register SR' has outputs $Q_1$ to $Q_m$, one for each of the m rows of the array 29, (but omitting an output for the dummy row Rd). The register is controlled by the start waveform phi S and the clock waveform phi CK, the latter illustrated in FIG. 8 and consisting of alternate high and low states, each period having the duration of one pixel time tp. The $Q_{1-m}$ outputs of the register are ANDed in the AND gates $T_{1-m}$ with the gating waveform phi G, the latter waveform defining the injection period within the second half of each pixel time. The ANDed waveforms control the m injection transfer switches $TS_{1-m}$ which connect the successive rows of pixels of the array to the source VRT. The ANDed outputs of gates $T_{1-m}$ are simultaneously inverted to control the m reset switches $RS_{1-m}$ which connect the successive rows of pixels to the row reset bias VRB after injection. The waveforms marked phi G; $Q_j$; $(Q_{j+1})$; (phi G AND $Q_j$); and (phi G AND $Q_{j+1}$) illustrate successive waveforms for the jth and (j+1)th rows. The last two of the above mentioned waveforms provide an initial "push" and a terminal "pull" as part of the injection operation for the jth and (j+1)th rows respectively, injection continuing so long as the ANDed waveforms go high (VRT).

The pedestal cancellation of the readout is provided by resort to the dummy row Rd, under the control of the inverter Ud, the transfer switch TSd which connects the source of row transfer potentials (VRT) to the dummy row for virtual injection, and the reset switch RSd which connects the source of row bias potentials (VRB) to the dummy row for virtual reset. The inverter (Ud) to which the gating waveform phi G is coupled, controls the transfer switch TSd while the uninverted gating waveform phi G controls the reset switch RSd.

More particularly, the dummy row is reset as the selected row is injected, and the dummy row is injected as the selected row is reset. Thus assuming that the actions on the selected jth row are "push-pull", the simultaneous actions on the dummy row are "pull-push". As seen in FIG. 8, injection of the jth row occurs and reset of the dummy row occurs as phi G goes high, the reset for the column and the first sample having taken place as S0 and S1 respectively went high at the beginning of the second half of the pixel time. Injection continues and settles until a second reading is taken as S3 goes high just before the end of phi G. When phi G goes low, the dummy row is injected, now providing a "push" on the row, capacitively coupled to the column and the selected row is simultaneously reset, now providing a "pull" on the row capacitively coupled by CRC to the column bus. Accordingly, neither injection of the selected row nor injection of the dummy row, which is capacitively coupled by CRC to the column bus occur without an offsetting reset, and the pedestal is efficiently cancelled at the input node N1 of the preamplifier of the column video processor.

As earlier stated, to the extent practical, the dummy row is optically and electrically identical to the other rows of the array, and the recurrent injection and reset facilitate accurate cancellation. Thus to the extent that each pixel in a column is like the dummy pixel in that column, the pedestal cancellation is exact, and preamplifier saturation avoided and current noise minimized.

In the first and the second embodiment, the waveform shown in FIG. 6D due to the injection of a row which appears at the column bus terminal 12 (node N1 of CVP), is a positive step transition of magnitude $$VX = VI\{[CCO/(CCO+CS)][CRO/(CRO+CRD+CCO+CCD)] + CRC/(CRC+CS)\} \quad \text{Eq.(1)}$$

under the empty well condition.

The reset disturbance on the column line in FIG. 6E has a negative step transition of the same magnitude as that due to injection when the row being reset has just been emptied of stored charge as in the case of the prior row as in the first embodiment or a dummy row as in the second embodiment, so long as the respective pixel sites have identical electrical properties. The cancellation is, therefore, exact, automatic, and independent of the injection voltage VI and other geometric parameters (CCO, CRO, CRC, etc.)

The pedestal cancellation provided in the second embodiment for each column may also be accomplished by means other than a dummy row, and the waveform used for cancellation may be provided by means external to the detector array. Such means are illustrated in FIGS. 9A and 9B.

The third embodiment is illustrated in a simplified schematic diagram in association with one of the n column video processors, a pedestal compensation arrangement being required for each of the n columns.

The pedestal cancellation circuit entails the inverter UC, a first compensating switch (SC1) connecting the node N0 to one terminal of an adjustable voltage source VC, and a second compensating switch (SC2) connecting node N0 to ground, and a capacitor C0 connected to the node N0.

Since the parameters determining the cancellation amplitude in Eq.(1) are not directly measurable, the cancellation means are set to an empirically determined optimum value by adjustment of the voltage VC.

The two waveforms most relevant to the third embodiment are shown in FIG. 9B. Otherwise the waveforms of FIG. 8 are applicable to the third embodiment.

As in the second embodiment, the waveform phi G is used to initiate injection on the selected row and terminate injection by resetting the selected row. The compensation waveform has like timing, and supplies the adjustable voltage (VC), determined by experiment to be the correct voltage, for the conditions of CID imager operation. The voltage is applied simultaneously with injection in a sense to cancel the pedestal, and is disconnected simultaneously with reset for minimal disturbance of the amplifier input.

The FIG. 9A arrangement is of generally lesser convenience than that of FIG. 7, since it is usually more convenient to provide a row of dummy pixels of like geometry to the active pixels and of like injection potential than to provide independent adjustments on a separate integrated circuit.

What is claimed is:

1. In an IR sensitive charge injection device (CID), the combination comprising:
   (A) an array comprising a substrate of IR sensitive semiconductor material supporting an interfacing layer of insulating material and on which m rows by n columns of pixel sites forming charge storing potential wells are arranged, each site having a conductive row gate and a conductive column gate, the charges at a site being free to flow at the interface between the column gate and row gate in the presence of a bias potential, said configuration producing capacitive coupling (CRC) between the row gate and column gate at each pixel site, the row gates for each row of sites being interconnected by a conductive row line and the column gates for each column of sites being interconnected by a conductive column line,
   (B) a readout circuit comprising:
      (a) a source (VRT) of row transfer potentials and m controllable row transfer switches ($TS_{1-m}$) for injecting signal charge into the substrate and transferring charge via the column line during readout,
      (b) shift register means (SRO,SRE) coupled to said row transfer switches for connecting a respective (jth) row line to said source (VRT) to begin injection, injection (duration ti) terminating with disconnection of said (jth) row line from said source (VRT)
      (c) row reset means including a source (VRB) of row bias potentials and m controllable row bias reset switches ($RS_{1-m}$), for establishing said charge storing potential wells at the row gates and for facilitating charge exchange between column and row gates at a site, said reset switches being timed to disconnect said (jth) row from said source VRB when injection of said jth row begins, the reconnection of said (jth) row line to said source (VRB) for reset occurring at the same instant that the (j+1)th row line is connected to said source (VRT) to begin injection of said (j+1)th row line, (d) n column video processors, each kth processor comprising:
  (1) a gain amplifier ($A1_k$) having the input thereof coupled to the (kth) column line at a first node ($N1_k$),
  (2) column reset means including a source (VCB) of column bias potentials and a controllable column bias reset switch ($S0_k$), for applying a column bias potential (VCB) to said first node ($N1_k$) for establishing said charge storing potential wells at the column gates, and for facilitating charge exchange between column and row gates at a site,
  (3) means including a series connected capacitor ($C1_k$) and a shunt connected switch ($S1_k$) coupled to the output of said gain amplifier for taking a first sample, means including a series connected switch ($S3_l$) and a shunt connected a capacitor ($C3_k$) coupled to the output of said first sample taking means for taking a second sample correlated to the first sample, and (e) timing means including a timing generator for timing the operation of said shift register and said reset switches, the readout of each selected site (jth row, kth column) being effected by switches $TS_j$, $RS_j$, $S0_k$, $S1_k$ and $S3_k$, the switches $S0_k$ and $S1_k$ being closed to reset the first node ($N1_k$) to start readout of the jth row, switch $S0_k$ being opened after resetting, switch $S1_k$ being opened after settling to finish charging capacitor $C1_k$ to obtain a first sample, followed by closure of the jth row transfer switch ($TS_j$) to inject signal charge into said substrate and to transfer charge to and from the column gates, said switch $S3_k$ being closed prior to the opening of the jth row transfer switch to obtain a second sample correlated with the first sample, closure of switch $S0_k$ at the end of injection resetting the first node ($N1_k$) to terminate readout of the jth pixel, the resetting of the $j^{th}$ row, which produces a negative going pulse due to said capacitive coupling (CRC), simultaneous with injection of said $(j+1)^{th}$ row, which produces a positive going pulse due to said capacitive coupling (CRC), cancelling the extraneous injection pedestal and reducing the voltage excursion at the input of said amplifier ($A1_k$).

2. The combination set forth in claim 1 wherein said shift register means are implemented by an odd row shift register controlling odd row lines, via odd row transfer switches, and an even row shift register controlling even row lines via even row transfer switches, said timing generator at pixel duration intervals simultaneously disconnecting all odd row lines from and connecting all even row lines to said source VRB; simultaneously connecting all odd row lines to and disconnecting all even row lines from said source VRB, and simultaneously connecting all even row lines to and disconnecting all odd row lines from said source VRB, etc. in a continuous sequence providing equal injection periods and equal reset periods between odd and even pixel sites.

3. In an IR sensitive charge injection device (CID), the combination comprising:

(A) an array comprising a substrate of IR sensitive semiconductor material supporting an interfacing layer of insulating material and on which m+1 rows by n columns of pixel sites forming charge storing potential wells are arranged, each site having a conductive row gate and a conductive column gate, the charges at a site being free to flow at the interface between the column gate and row gate in the presence of a bias potential, said configuration producing capacitive coupling (CRC) between the row gate and column gate at each pixel site, the row gates for each row of sites being interconnected by a conductive row line and the column gates for each column of sites being interconnected by a conductive column line, (B) a readout circuit comprising:
  (a) a source (VRT) of row transfer potentials and (m+1) controllable row transfer switches the ($TS_{1-m}$, $TS_d$), for injecting signal charge into substrate and transferring charge via the column line during readout, of row bias potentials and (m+1) controllable row bias reset switches ($RS_{1-m}RS_d$), for establishing said charge storing potential wells at the row gates and for facilitating charge exchange, between column and row gates at a site,
  (c) row selection means including a shift register (SR') having m outputs for controlling said row transfer switches ($TS_{1-m}$) for selected (jth) member of said set of m row lines to said source (VRT) to begin injection, injection (duration ti) terminating with disconnection of said (jth) row line from said source (VRT), and for controlling said row reset switches ($RS_{1-m}$) for disconnecting said (jth) row from said row bias source (VRB) when injection of said selected jth row begins and for connecting said (jth) row to said bias source (VRB) when injection of said selected jth row ends,
    said row bias reset switch $RS_d$ connecting said (m+1)th row line to said source (VRB) simultaneously with the connection of each selected (jth) row to said source (VRT), and said row transfer switch $TS_d$ connecting said (m+1)$^{th}$ row line to said source (VRT) simultaneously with the connection of each selected (jth) row to said source (VRB),
  (d) n column video processors, each kth processor comprising:
    (1) a gain amplifier ($A1_k$) having the input thereof coupled to the (kth) column line at a first node ($N1_k$),
    (2) column reset means including a source (VCB) of column bias potentials and a controllable column bias reset switch ($S0_k$), for applying a column bias potential (VCB) to said first node ($N1_k$) for establishing said charge storing potential wells at the column gates, and for facilitating charge exchange between column and row gates at a site, (3) means including a series connected capacitor (C1$_k$) and a shunt connected switch S1$_k$ coupled to the output of said gain amplifier, for taking a first sample, (4) means including a series connected switch (S3$_k$)and a shunt connected capacitor C3$_k$ coupled to the output of said first sample taking means for taking a second sample correlated with the first sample, and (e) timing means including a timing generator for timing the operation of said shift register and said reset switches, the readout of each selected site (jth row, kth column) being effected by switches TS$_j$ and TSd, RS$_j$ and RSd, S0$_k$, S1$_k$, and S3$_k$, the switches S0$_k$ and S1$_k$ being closed to reset the first node (N1$_k$) to start readout of the jth being opened after settling to finish charging capacitor C1$_k$ to obtain a just sample, followed by closure of the jth row transfer switch (TS$_j$) to inject signal charge into said substrate and to transfer charge to and from the column gates, said switch S3$_k$ being closed prior to the opening of the jth row transfer switch to obtain a second sample correlated with the first sample, closure of switch S0$_k$ at the end of injection resetting the first node (N1$_k$) to terminate readout of the jth pixel, the resetting of the (m+1)th row, simultaneous with injection of each row, and the injection of the (m+1)th row, simultaneous with reset of each row, cancelling the injection pedestal and reducing the voltage excursion on all N1 modes.

4. The combination set forth in claim 3 wherein:
said means B(c) comprises a (1) shift register having m outputs, (2) m two input AND gates (T$_{1-m}$), one input of each being connected to a respective output of said shift register, the output of each AND gate being connected to control a respective row transfer switch (TS$_{1-m}$), (3) m+1 inverters (U$_{1-m}$, Ud) the jth member of the set (U$_{1-m}$) of inverters being connected to a respective output of each (jth) AND gate and the output of each jth inverter being connected to control a respective (jth) row reset switch (RS$_{1-m}$), and wherein (e') said timing generator provides a waveform (phi G) having a high state once each pixel period, the high state having a duration (ti) for timing injection and reset, said waveform being coupled to the other input of all AND gates (T$_{1-m}$) to time injection, and to control the (m+1)th row reset switch (RSd); and to the input of the (m+1)th inverter to control the (m+1)th row transfer switch (TSd).

5. In an IR sensitive charge injection device (CID), the combination comprising:

(A) an array comprising a substrate of IR sensitive semiconductor material supporting an interfacing layer of insulating material and on which m rows by n columns of pixel sites forming charge storing potential wells are arranged, each site having a conductive row gate and a conductive column gate, the charges at a site being free to flow at the interface between the column gate and row gate in the presence of a bias potential, said configuration producing capacitive coupling (CRC) between the row gate and column gate at each pixel site, the row gates for each row of sites being interconnected by a conductive row line and the column gates for each column of sites being interconnected by a conductive column line, (B) a readout circuit comprising:
  (a) a source (VRT) of controllable row transfer switches (TS$_{1-m}$), for injecting signal charge into the substrate and transferring charge via the column line during readout,
  (b) row reset means including a source (VRB) of row bias potentials and m controllable row bias reset switches (RS$_{1-m}$), for establishing said charge storing potential wells at the row gates and for facilitating charge exchange between column and row gates at a site,
  (c) row selection means including a shift register (SR') having m outputs for controlling said row transfer switches (TS$_{1-m}$) successively connecting a selected (jth) row line to said source (VRT) to begin injection, injection (duration ti) terminating with disconnection of said (jth) row line from said source (VRT); and for controlling said row reset switches (RS$_{1-m}$) for disconnecting said (jth) row from said row bias source (VRB) when injection of said selected jth row begins and for connecting said (jth) row to said bias source (VRB) when injection of said selected jth row ends,
  (d) n column video processors, each kth processor comprising:
    (1) a gain amplifier (A1$_k$) having the input thereof coupled to the (kth) column line at a first node (N1$_k$),
    (2) column reset means including a source (VCB) of column bias potentials and a controllable column bias reset switch (S0$_k$), for applying a column bias potential (VCB) to said first node (N1$_k$) for establishing said charge storing potential wells at the column gates, and for facilitating charge exchange between column and row gates at a site,
    (3) means including a series connected capacitor (C1$_k$) and a shunt connected switch S1$_k$ coupled to the output of said gain amplifier, for taking a first sample,
    (4) means including a series connected switch (S3$_k$) and a shunt connected capacitor (C3$_k$) coupled to the output of said first sample taking means for taking a second sample correlated with the first sample, and
    (5) a pedestal cancellation network comprising
      (i) a source of pedestal cancellation voltage (VC)
      (ii) a capacitor (C0$_k$) having one terminal coupled to a node N0$_k$ and the other to the node N1$_k$
      (iii) a first pedestal cancellation switch SC1$_k$ connected between said source VC and said node N0$_k$
      (iv) an inverter UC$_k$ having the output connected to control said first switch SC1$_k$
      (v) a second pedestal cancellation switch SC2$_k$ connected between ground and said node N0$_k$
  (e) timing means including a timing generator for timing the operation of said shift register, said reset switches and said pedestal cancellation network, the readout of each selected site (jth row, kth column) being effected by switches $TS_j$, $RS_j$, $S0_k$, $S1_k$ and $S3_k$, and pedestal cancellation being effected by switches $SC1_k$ and $SC2_k$ the switches $S0_k$ and $S1_k$ being closed to reset the first node ($N1_k$) to start readout of the jth row, switch $S0_k$ being opened after resetting, switch $S1_k$ being opened after settling to finish charging capacitor $C1_k$ to obtain a first sample, followed by closure of the jth row transfer switch ($TS_j$) to inject signal charge into said substrate and to transfer charge to and from the column gates, said switch $S3_k$ being closed prior to the opening of the jth row transfer switch to obtain a second sample correlated with the first sample, closure of switch $S0_k$ at the end of injection resetting the first node to terminate readout of the jth pixel, switch $SC1_k$ being opened and switch $SC2_k$ being closed simultaneously with injection of each row, and switch $SC1_k$ being closed and switch $SC2_k$ being opened simultaneously with the resetting of each row to cancel the injection pedestal and reduce the voltage excursion on all N1 nodes.

* * * * *

UNITED STATES PATENT AND TRADEMARK OFFICE
CERTIFICATE OF CORRECTION

PATENT NO.   : 4,862,276

DATED        : AUGUST 29, 1989

INVENTOR(S)  : S. WANG, J. SWAB AND M. WINN

It is certified that error appears in the above-identified patent and that said Letters Patent is hereby corrected as shown below:

On the title page, insert:

--ASSIGNEE: GENERAL ELECTRIC COMPANY--.

Signed and Sealed this

Tenth Day of July, 1990

Attest:

HARRY F. MANBECK, JR.

Attesting Officer

Commissioner of Patents and Trademarks